Figure 1:
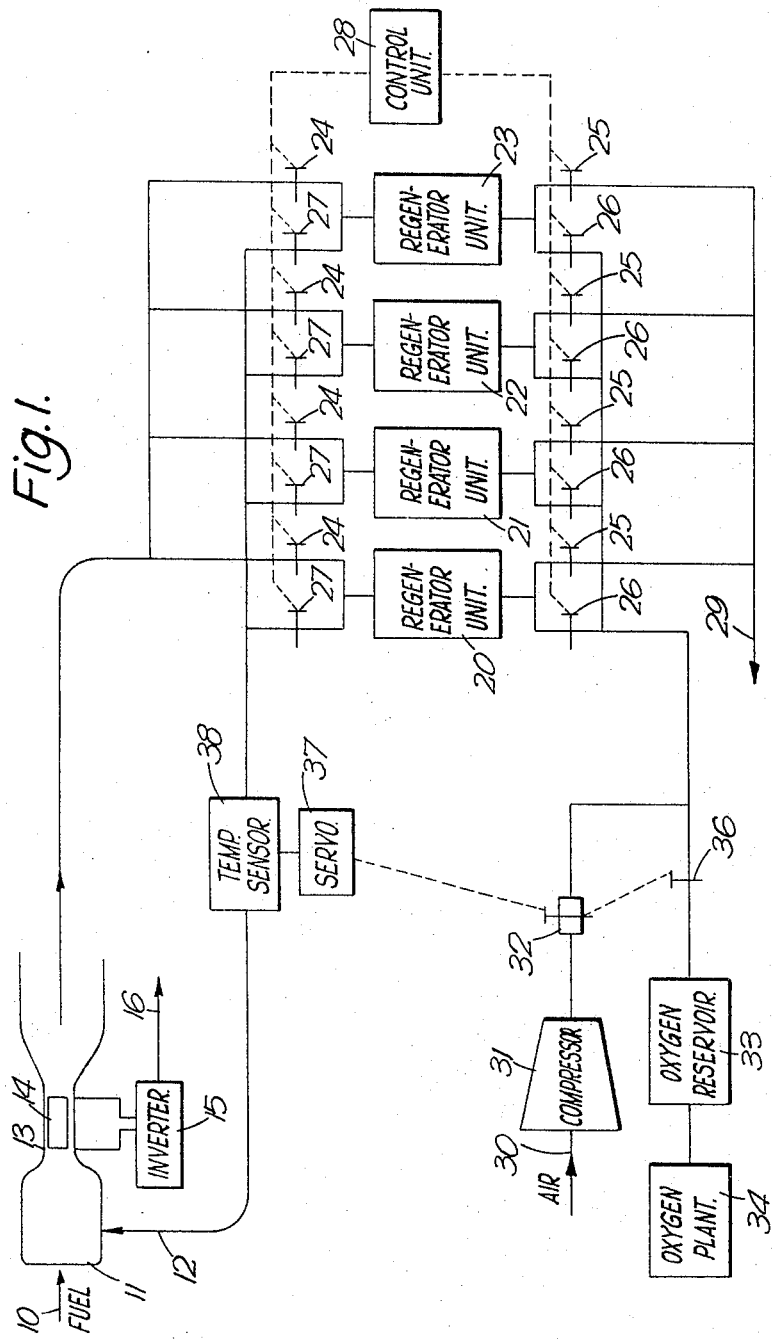

March 19, 1968 T. BROOM 3,374,369
MAGNETOHYDRODYNAMIC ELECTRICAL GENERATORS
Filed March 22, 1965 2 Sheets-Sheet 1

United States Patent Office 3,374,369
Patented Mar. 19, 1968

3,374,369
MAGNETOHYDRODYNAMIC ELECTRICAL GENERATORS
Trevor Broom, Stoke D'Abernon, England, assignor to Central Electricity Generating Board, London, England, a British body corporate
Filed Mar. 22, 1965, Ser. No. 441,509
Claims priority, application Great Britain, Mar. 24, 1964, 12,458/64
12 Claims. (Cl. 310—11)

This invention relates to magnetohydrodynamic (M.H.D.) electrical generators and is directed more particularly to an open cycle generator in which fuel is burnt with air in order to produce a hot ionised gas which flows through a magnetic field to give an electrical output between spaced electrodes.

In such M.H.D. electrical generators, in order to ionise the gas, even if it is seeded with an ionising seeding material such as potassium, it is essential to have an extremely high temperature and the air feed used for combustion purposes has to be preheated to a temperature which might typically be of the order of 1200° C. For various reasons, it may be convenient to use regenerative pre-heaters for this purpose making use of the heat in the combustion products leaving the M.H.D. duct. However if two or more such regenerative pre-heaters are cylically switched into operation for heating the combustion air, the temperature of the combustion air will fluctuate at this cyclic switching frequency. This is very undesirable since the conductivity of the combustion gases is very dependent upon their temperature and a small fall in that temperature of the gases can give an appreciable decrease in the efficiency of the generator. It is possible to reduce the temperature fluctuation by increasing the number of pre-heater units but this increases the cost of the equipment. The present invention is directed to overcoming or reducing the effects on the M.H.D. generator of temperature variations due to cyclic switching of a regenerative preheater and thereby enabling a wider range of temperature variation to be tolerated.

According to this invention, in an open cycle magnetohydrodynamic electrical power generator in which a fuel is burnt with air, the air being pre-heated by regenerative pre-heaters which are switched cyclically, means are provided for periodic injection of oxygen into the air feed at the pre-heater change-over frequency to increase or maintain the flame temperature as the temperature of the pre-heated air decreases. In practice the oxygen may be injected for only a part of each cycle. The addition of oxygen will increase the flame temperature and thus, by injecting oxygen as the air temperature falls, the flame temperature can be held constant. Means may be provided for controlling the rate of injection of oxygen automatically to vary cyclically at the pre-heater change-over frequency in such a manner as to maintain the temperature of the combustion products substantially constant or to maintain the power output of the generator substantially constant.

By the use of such periodic oxygen injection, the number of the regenerative pre-heater units is decreased compared with what would be necessary in the absence of oxygen injection; since the amount of oxygen required however is only small and since it may be only injected intermittently, the arrangement does not suffer from the economic disadvantages which arise if continuous oxygen enrichment is employed.

Conveniently, the rate of injection of oxygen and air are jointly controlled. This may be done by a servo responsive to the temperature of the combustion air from the pre-heater. The oxygen and air may be controlled by gauged regulators programmed to give a constant electrical output from the M.H.D. generator.

The oxygen, during periods when it is injected, may be combined with the air before the latter is fed to said pre-heater.

Figure 2:
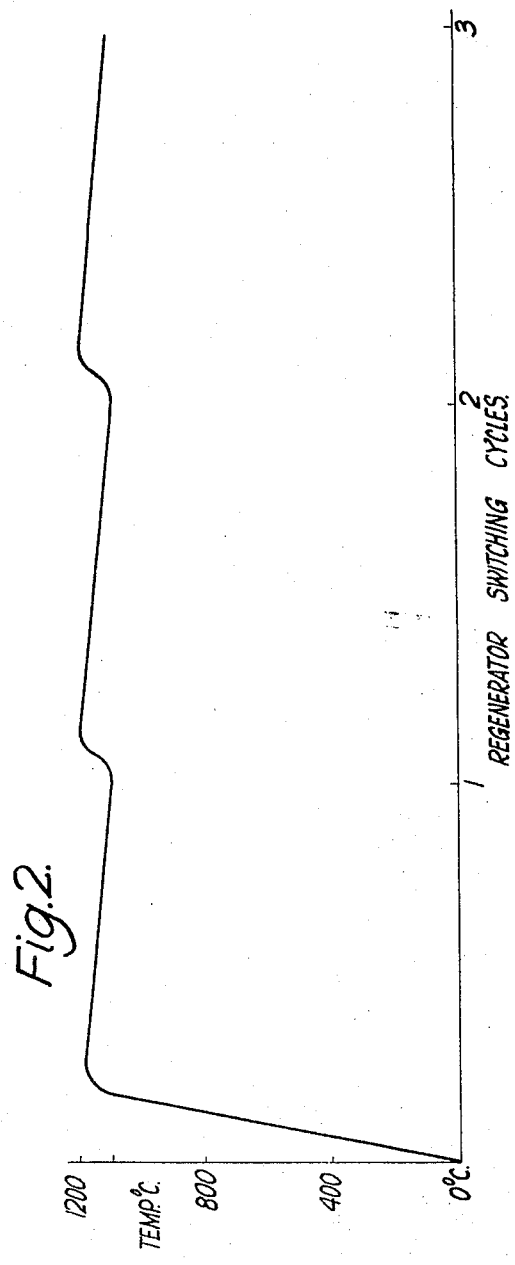

The following is a description of one embodiment of the invention, reference being made to the accompanying drawings in which:

FIGURE 1 is a diagram illustrating a magnetohydrodynamic electrical power generator; and FIGURE 2 is a graphical diagram illustrating variation of the temperature of the pre-heated combustion air in the apparatus of FIGURE 1 during the switching cycles of the regenerative pre-heater.

Referring to FIGURE 1, there is illustrated diagrammatically a magnetohydrodynamic electrical power generating apparatus in which hot conductor gases obtained by burning a fuel are passed through a magnetic field which extends transversely across a generating duct. The fuel is injected at 10 into a combustion chamber 11. Air for combustion of the fuel is fed in at 12 and the resultant hot gases, which may be seeded in the known way with a seed material, such as a chemical compound containing potassium or caesium, are passed through the generating duct shown diagrammatically at 13. A magnetic field, produced by an electro-magnet 14, extends across the duct and the passage of the conductive gases through this magnetic field generates electrical power which is fed from electrodes in the duct. The direct current from the electrodes may typically be converted to alternating current in an invertor 15 and fed to a load circuit 16.

To give the required electrical conductivity of the gases in the duct 13, even with seeding by an alkali metal, it is essential to have a very high temperature, typically of the order of 2500–3000° C. To obtain this temperature burning a fossil fuel in air, the air feed for combustion purposes has to be pre-heated, typically to a temperature of the order of 1200° C. For this purpose, it is convenient to use a regenerative type of pre-heater to heat the combustion air making use of the heat in the exhaust gases from the duct 13. The pre-heater is illustrated in FIGURE 1, merely by way of example, as containing four regenerator units 20, 21, 22 and 23. Admission of the exhaust gases from the duct 13 to the regenerator units is controlled by valves 24 and the outlet of the gases from the units 20–23 is controlled by valves 25. Admission of combustion air to the regenerator units is controlled by valves 26 whilst the outlet of the combustion air is controlled by valves 27. The valves 24 to 27 are controlled by a regenerator cycle control unit shown diagrammatically at 28 which operates the various valves in a switching sequence so that the various regenerator units are used cyclically for heating the combustion air.

The exhaust gases from the duct 13, after passing through the regenerative pre-heater, are fed to an outlet 29. These gases are still at quite a high temperature and the heat in the gases may be utilized (by means not shown) for raising steam which may be used to drive a turbo alternator. The present invention is concerned with the effect of the temperature variation of the combustion air for the pre-heater.

This combustion air, from an air intake 30, is compressed by a compressor 31 and fed through a regulator 32 to be described later, to the valves 26 and thus through the selected regenerator unit or units. From the valves 27, the heated air is fed into the combustion chamber at 12. The temperature of the air flowing from the regenerator system steadily falls, as heat is given up by a regenerator unit or units, until the air flow is switched to another unit. The temperature of the combustion air thus varies cyclically as is shown in FIGURE 2 which is a graphical diagram showing how the combustion air temperature (as ordinate) initially rises when the equipment is first brought into operation and then, during each cycle, rapidly rises at the beginning of each cycle and gradually falls until the air is switched to the next unit. This cyclic variation of temperature of the combination air would produce a similar fluctuation in the combustion teemperature if other conditions were constant.

For understanding the present invention, it is sufficient to consider only a simple case in which the air flow is through one regenerator unit at a time, the units being switched in a cyclic sequence. It would be possible to employ other switching sequences when a large number of regenerator units are employed. Whatever the arrangement, however, with a regenerative air pre-heater, the temperature will vary cyclically in the manner indicated in FIGURE 2. The temperature variation of 100° C. indicated in this figure, however, is merely an illustrative example of this variation.

The conductivity of the gases in the duct 13 is very dependent on their temperature and a small fall in temperature can give an appreciable decrease in the efficiency of the generator. To overcome this problem, in the arrangement of FIGURE 1, oxygen from a reservoir 33 supplied by an oxygen plant 34 is fed through a flow regulator 36 and combined with the combustion air from the flow regulator 32 before being fed to the regenerative preheater 20–23. The flow regulators 32, 36 are controlled by a servo 37 responsive to the temperature of the combustion air fed from the pre-heater to the combustion chamber, the temperature being sensed by a temperature sensor 38. The servo 37 controls the two regulators 32, 36 in such a manner that the total amount of the air and oxygen mixture is that required for feeding into the combustion chamber 11 but the proportion of oxygen is increased during each cycle as the temperature sensed by the temperature sensor 38 gradually falls. The required oxygen/air mixture may be such as to give stoichiometric, fuel rich, or oxygen rich combustion. The servo 37 is programmed, in accordance with known overall performance of the system, so as to maintain, in this particular embodiment, the electrical output power from the generating duct substantially constant during the cyclic variation of the combustion air temperature. It may be necessary to inject oxygen during only part of each cycle of the regenerator switching.

Although in the foregoing specific embodiment, there has been described a programmed servo system responsive to the combustion air temperature, it will be readily apparent that the oxygen-enrichment of the combustion air could be cyclically controlled in other ways to maintain the output power constant despite the variations in the combustion air temperature due to the cyclic switching of the regenerator units.

I claim:
1. In an open cycle magnetohydrodynamic electrical power generator in which fuel is burnt with air the combination of cyclically switched regenerative pre-heaters for pre-heating the combustion air and means for periodic injection of oxygen into the air feed at the preheater switching frequency to increase or maintain the flame temperature as the temperature of the pre-heated air decreases.

2. An open cycle magnetohydrodynamic electrical power generator as claimed in claim 1 wherein said injection means are arranged to inject oxygen only for a part of each cycle.

3. An open cycle magnetohydrodynamic electrical power generator as claimed in claim 1 wherein means are provided for controlling the rate of injection of oxygen automatically to vary cyclically at the pre-heater change-over frequency in such a manner as to maintain the temperature of the combustion products substantially constant.

4. An open cycle magnetohydrodynamic electrical power generator as claimed in claim 1 wherein means are provided for controlling the rate of injection of oxygen automatically to vary cyclically at the pre-heater change-over frequency in such a manner as to maintain the power output of the generator substantially constant.

5. An open cycle magnetohydrodynamic electrical power generator as claimed in claim 1 wherein said means for periodic injection of oxygen includes a servo responsive to the temperature of the combustion air for controlling the rate of injection of oxygen and air.

6. An open cycle magnetohydrodynamic electrical power generator as claimed in claim 5 wherein said servo is programmed to maintain the power output of the generator constant as the combustion air temperature varies.

7. In an open cycle magnetohydrodynamic electrical power generator in which fuel is burnt with air, the combination of a plurality of regenerative pre-heater units for pre-heating said air, control means for cyclically switching said pre-heater units, an oxygen supply source, means for combining oxygen from said supply source with said air and control means for variably controlling the oxygen enrichment of the combustion air at the preheater cyclic switching frequency.

8. In an open cycle magnetohydrodynamic electrical power generator in which fuel is burnt with air, the combination of a plurality of regenerative pre-heater units for pre-heating said air, control means for cyclically switching said pre-heater units, an oxygen supply source, means for combining oxygen from said supply source with said air, a temperature sensor sensing the temperature of the combustion air after pre-heating, and means controlling the oxygen enrichment of the combustion air in accordance with the temperature sensed by said temperature sensor.

9. In an open cycle magnetohydrodynamic electrical power generator in which fuel is burnt with air, the combination of a plurality of regenerative pre-heater units for preheating said air, control means for cyclically switching said pre-heater units, an oxygen supply source, means for combining oxygen from said supply source with said air, a temperature sensor sensing the temperature of the combustion air after pre-heating and means controlling the flow of oxygen and of combustion air in accordance with the temperature sensed by said temperature sensor.

10. In an open cycle magnetohydrodynamic electrical power generator in which fuel is burnt with air, the combination of a plurality of regenerative pre-heater units for pre-heating said air, control means for cyclically switching said pre-heater units, an oxygen supply source, means for combining oxygen from said supply source with said air, a flow control valve for said oxygen, a flow control valve for said air, and programmed control means operatively responsive to the temperature of said air after pre-heating for controlling said flow control valves.

11. In an open cycle magnetohydrodynamic electrical power generator in which fuel is burnt with air, the combination of a plurality of regenerative pre-heater units for pre-heating said air, control means for cyclically switching said pre-heater units, an oxygen supply source, means for combining oxygen from said supply source with said air, a flow control valve for said oxygen, a flow control valve for said air, and a servo-operated programmed controller for said flow control valves at the pre-heater cyclic switching frequency to maintain the output of said power generator constant.

12. An open cycle magnetohydrodynamic electrical power generator as claimed in claim 11 wherein the oxygen from said oxygen flow control valve is combined with the air from said air flow control valve before the air is passed to said pre-heater.

References Cited

UNITED STATES PATENTS 3,303,364   2/1967   Hals _____ 310—11

DAVID X. SLINEY, *Primary Examiner.*